(12) United States Patent
Soeda et al.

(10) Patent No.: US 7,879,272 B2
(45) Date of Patent: Feb. 1, 2011

(54) ORIENTED THERMOPLASTIC ELASTOMER FILM AND PROCESS FOR PRODUCING THE SAME

(75) Inventors: Yoshihiro Soeda, Hiratsuka (JP); Andy Haishung Tsou, Houston, TX (US); Foshee Joyce Caraway, Crosby, TX (US)

(73) Assignees: ExxonMobil Chemicals Patents, Inc., Houston, TX (US); The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 12/648,057

(22) Filed: Dec. 28, 2009

(65) Prior Publication Data

US 2010/0113701 A1    May 6, 2010

Related U.S. Application Data

(62) Division of application No. 10/548,064, filed as application No. PCT/US03/06560 on Mar. 6, 2003, now abandoned.

(51) Int. Cl.
B29C 49/08 (2006.01)
B29C 49/16 (2006.01)
B29C 71/00 (2006.01)

(52) U.S. Cl. ............ 264/235.8; 264/108; 264/210.5; 264/210.7; 264/212; 264/214; 264/216; 264/291; 264/299; 264/331.11; 264/331.15; 264/331.16; 264/331.19; 428/220; 428/221; 428/327; 428/332; 428/338; 428/339; 525/178; 525/180; 525/184; 525/186

(58) Field of Classification Search ........ 428/220, 428/221, 327, 332, 338, 339; 525/178, 180, 525/184, 186
See application file for complete search history.

(56) References Cited

U.S. PATENT DOCUMENTS

| | | | |
|---|---|---|---|
| 5,576,372 A | 11/1996 | Kresge et al. | |
| 5,576,373 A | 11/1996 | Kresge et al. | |
| 5,665,183 A | 9/1997 | Kresge et al. | |
| 6,334,919 B1 | 1/2002 | Takeyama et al. | |
| 6,359,071 B1 | 3/2002 | Watanabe et al. | |
| 6,376,598 B1 | 4/2002 | Wang | |
| 6,966,999 B2 * | 11/2005 | Tsou et al. | 264/291 |

FOREIGN PATENT DOCUMENTS

| | | |
|---|---|---|
| EP | 0857761 A1 | 8/1998 |
| EP | 0722850 B1 | 5/1999 |
| EP | 0969039 A1 | 1/2000 |
| JP | 8-216610 | 8/1996 |
| JP | 8-217922 | 8/1996 |
| JP | 8-217923 | 8/1996 |
| JP | 8-259741 A | 10/1996 |
| JP | 9-124848 | 5/1997 |
| JP | 9-143366 | 6/1997 |
| JP | 9-314752 | 12/1997 |
| JP | 9-316344 | 12/1997 |
| JP | 10-16137 | 1/1998 |
| JP | 10-025375 A | 1/1998 |
| JP | 10-36571 | 2/1998 |
| JP | 10-86605 | 4/1998 |
| JP | 10-114840 | 5/1998 |
| RU | 2124534 C1 | 1/1999 |
| WO | WO-02/14410 | 2/2002 |

OTHER PUBLICATIONS

Decision on Grant Patent For Invention issued Jan. 18, 2007.
PCT International Search Report for PCT/US03/06560 mailed on Dec. 4, 2003.
PCT International Preliminary Examination Report for PCT/US03/06560 mailed on Jul. 13, 2005.

* cited by examiner

Primary Examiner—Ana L Woodward
(74) Attorney, Agent, or Firm—Connolly Bove Lodge & Hutz LLP

(57) ABSTRACT

An oriented thermoplastic elastomer film having reduced permeability and improved fatigue resistance comprising a dynamically vulcanized polymer blend of (A) a halogenated isobutylene elastomer and (B) polyamide, the film is produced by casting or blowing the above polymer blend under the condition such that a shear rate at a die lip for casting or blowing is regulated to control the molecular arrangement in the film, whereby the planar birefringence (PBR) of the resultant film becomes greater or equal to 0.002 and a production process of the same.

6 Claims, 1 Drawing Sheet

ORIENTED THERMOPLASTIC ELASTOMER FILM AND PROCESS FOR PRODUCING THE SAME

CROSS-REFERENCES TO RELATED APPLICATIONS

This application is a divisional application of U.S. Ser. No. 10/548,064 filed Jun. 6, 2006, which in is the US National Stage of PCT/US03/06560, filed Mar. 6, 2003, the entire disclosures of which are incorporated herein by reference.

TECHNICAL FIELD

The present invention relates to an oriented thermoplastic elastomer film having reduced permeability and improved fatigue resistance and also to a method of preparing the same. More particularly, the present invention relates to a process for producing a thermoplastic elastomer film composition with enhanced planar orientation for reduction in gas permeability and a process for producing a pneumatic tire using the same.

BACKGROUND ART

EP722850B1 disclosed a low-permeability thermoplastic elastomer composition that is superior as a gas-barrier layer in pneumatic tires. This thermoplastic composition comprises a low-permeability thermoplastic matrix such as polyamides or blends of polyamides, in which a low-permeability rubber such as brominated poly(isobutylene-co-p-methylstyrene) (i.e., or BIMS) is dispersed. Subsequently, in both EP857761A1 and EP969039A1, viscosity ratio between the thermoplastic matrix and the rubber dispersion was specified in order to achieve phase continuity in thermoplastic and fine rubber dispersions. Criticality of smaller rubber dispersions was recognized in EP969039A1 in these thermoplastic elastomers for delivering acceptable durability especially for their usage as innerliners in pneumatic tires.

Further improvement in impermeability of these low-permeability thermoplastic elastomers could be achieved by imposing planar orientation. In WO 0214410, introduction of orientation into a thermoplastic elastomer film for property enhancement and for permeability reduction was disclosed conceptually. No experimental data were provided in this patent application. Further, the process specified in this application involves bi-axial orientation of cast film through drafting, tentering, and heatsetting by assuming the film in discussion has the strain hardening characteristics and suitable stretching dynamics. In the present invention, the planar orientation in a thermoplastic elastomer cast film is imposed simply by the film casting and/or film blowing process and film blowing for the improvement in film properties. This thermoplastic elastomer film does not have the suitable stretching dynamics for it to be oriented by a sequential bi-axial orientation process.

SUMMARY OF INVENTION

The objects of the present invention are to provide an oriented thermoplastic elastomer film having a reduced gas permeability and improved fatigue resistance and also to provide a method of preparing the same.

In accordance with the present invention, there is provided an oriented thermoplastic elastomer film having reduced permeability and improved fatigue resistance comprising a dynamically vulcanized polymer blend of (A) a halogenated isobutylene elastomer and (B) polyamide, the film is produced by casting or blowing the above polymer blend under the condition such that a shear rate at a die lip for casting or blowing is regulated to control the molecular arrangement in the film, whereby the planar birefringence (PBR) of the resultant film becomes greater or equal to 0.002, preferably the PBR is 0.004 or more.

DISCLOSURE OF INVENTION

In this specification and in the claims which follow, the singular forms "a", "an" and "the" include plural referents unless the context clearly dictates otherwise.

The present invention relates to an oriented thermoplastic elastomer film having reduced permeability and improved fatigue resistance and to a method of preparing the same.

More particular, the present invention relates to film casting and blowing processes for producing a thermoplastic elastomer film with enhanced planar orientation and a process for producing a pneumatic tire using the same.

The preferred planar birefringence of the oriented thermoplastic elastomer film is greater or equal to 0.002. The orientation could be imposed by either increasing wind-up speed during casting and blowing or increasing the blow-up ratio during film blowing.

BRIEF DESCRIPTION OF THE DRAWINGS

The present invention will be better understood from the description set forth below with reference to the accompanying drawing of FIG. 1, which shows the correlation between the planar orientation of the film and the permeability thereof.

The thermoplastic elastomer composition is a blend of a halogenated isobutylene elastomer and a polyamide, which is subjected to dynamic vulcanization.

Figure 1:
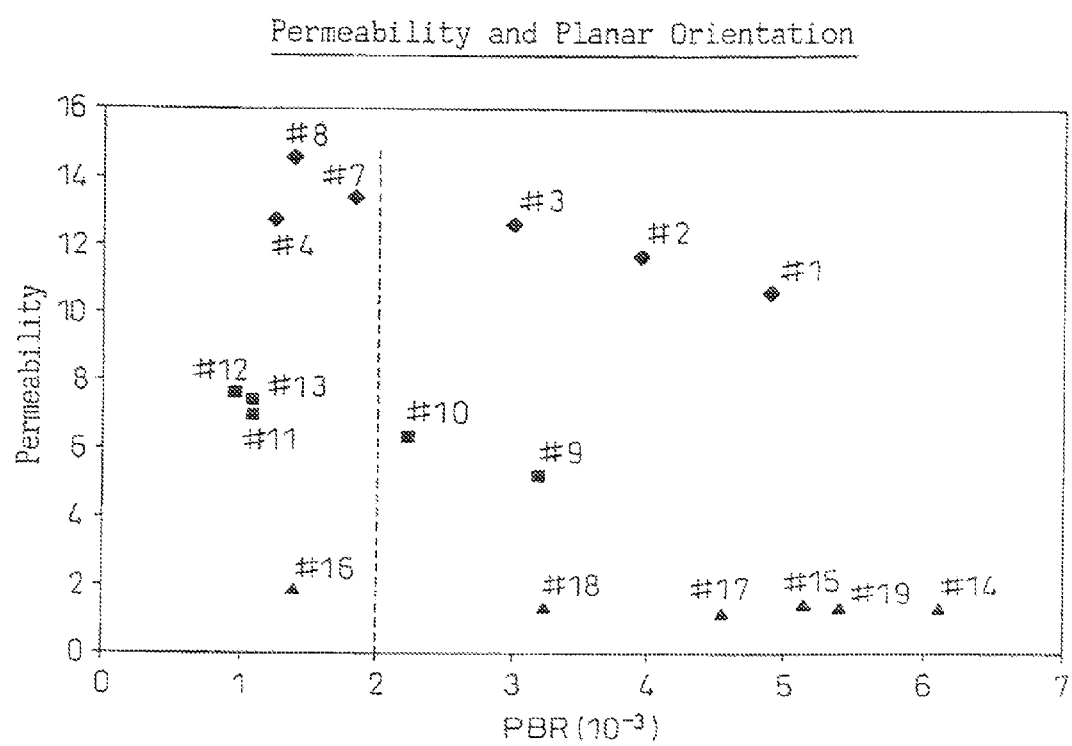

The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix.

Dynamic vulcanization is effected by mixing the ingredients at a temperature which is at or above the curing temperature of the elastomer in equipment such as roll mills, Banbury® mixers, continuous mixers, kneaders or mixing extruders, e.g., twin screw extruders. The unique characteristic of the dynamically cured compositions is that, notwithstanding the fact that the elastomer component may be fully cured, the compositions can be processed and reprocessed by conventional rubber processing techniques such as extrusion, injection molding, compression molding, etc. Scrap or flashing can be salvaged and reprocessed.

In a preferred embodiment the halogenated isobutylene elastomer component include copolymers of isobutylene and para-alkylstyrene, such as described in European Patent Application 0 344 021. The copolymers preferably have a substantially homogeneous compositional distribution. Preferred alkyl groups for the para-alkyl styrene moiety include alkyl groups having from 1 to 5 carbon atoms, primary haloalkyl, secondary haloalkyl having from 1 to 5 carbon atoms and mixtures thereof. A preferred copolymer comprises isobutylene and para-methylstyrene.

Suitable halogenated isobutylene elastomer components include copolymers (such as brominated isobutylene-paramethylstyrene copolymers) having a number average molecular weight Mn of at least about 25,000, preferably at least about 50,000, preferably at least about 75,000, preferably at least about 100,000, preferably at least about 150,000. The copolymers may also have a ratio of weight average molecular weight (Mw) to number average molecular weight (Mn), i.e., Mw/Mn of less than about 6, preferably less than about 4, more preferably less than about 2.5, most preferably less than about 2.0. In another embodiment, suitable halogenated isobutylene elastomer components include copolymers (such as brominated isobutylene-paramethylstyrene copolymers) having a Mooney viscosity (1+4) at 125° C. (as measured by ASTM D 1646-99) of 25 or more, preferably 30 or more, more preferably 40 or more.

Preferred brominated copolymers of isobutylene and para-methylstyrene include those having 5 to 12 weight % para-methylstyrene, 0.3 to 1.8 mol % brominated para-methylstyrene, and a Mooney viscosity of 30 to 65(1+4) at 125° C. (as measured by ASTM D 1646-99).

The halogenated isobutylene elastomer component (A) according to the present invention can be prepared from isobutylene and about 0.5 to 25% by weight, preferably about 2 to 20% by weight, based upon the total amount of the comonomers, of p-alkylstyrene, preferably p-methylstyrene, followed by the halogenation. The content of the halogen (e.g., Br and/or Cl, preferably Br) is preferably less than about 10% by weight, more preferably about 0.1 to about 7% by weight, based upon the total amount of the copolymer.

The copolymerization can be carried out in a known manner as described in, for example, European Patent Publication No. EP-34402/A published Nov. 29, 1989 and the halogenation can be carried out in a known method as described in, for example, U.S. Pat. No. 4,548,995.

The halogenated isobutylene elastomer preferably has the number-average molecular weight ($\overline{Mn}$) of at least about 25,000, more preferably at least about 100,000 and a ratio of the weight-average molecular weight ($\overline{Mw}$) to the number-average molecular weight ($\overline{Mn}$), i.e., $\overline{Mw}/\overline{Mn}$ of preferably less than about 10, more preferably less than about 8.

The polyamides usable in the present invention are thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams such as caprolactam, pyrrolidione, lauryllactam and aminoundecanoic lactam, or amino acid, or by condensation of dibasic acids and diamines. Both fiber-forming and molding grade nylons are suitable. Examples of such polyamides are polycaprolactam (Nylon 6), polylauryllactam (Nylon 12), polyhexamethyleneadipamide (Nylon 66), polyhexamethyleneazelamide (Nylon 69), polyhexamethylenesebacamide (Nylon 610), polyhexamethyleneisophthalamide (Nylon 6 IP), Nylon 612, Nylon 46, Nylon MXD 6, Nylon 6/66 and the condensation product of 11-amino-undecanoic acid (Nylon 11). Additional examples of satisfactory polyamides (especially those having a softening point below 275° C.) are described in Kirk-Othmer, Encyclopedia of Chemical Technology, v. 10, page 919, and Encyclopedia of Polymer Science and Technology, Vol. 10, pages 392-414. Commercially available thermoplastic polyamides may be advantageously used in the practice of this invention, with linear crystalline polyamides having a softening point or melting point between 160° C.-230° C. being preferred.

The amounts of the elastomer (A) and the polyamide (B) usable in the present invention is preferably 95 to 25 parts by weight and 5 to 75 parts by weight, more Preferably 90 to 25 parts by weight and 10 to 75 parts by weight, respectively, provided that the total amount of the components (A) and (B) is 100 parts by weight.

The elastomer composition according to the present invention may contain, in addition to the above-mentioned essential ingredients, a vulcanization or cross-linking agent, a vulcanization or cross-linking accelerator, various types of oils, an antiaging agent, reinforcing agent, plasticizer, softening agent, or other various additives generally mixed into general rubbers. The compounds are mixed and vulcanized by general methods to make the composition which may then be used for vulcanization or cross-linking. The amounts of these additives added may be made the amounts generally added in the past so long as they do not run counter to the object of the present invention.

EXAMPLES

The present invention will now be further illustrated by, but is by no means limited to, the following Examples.

The following commercially available products were used for the components employed in the Examples.

1. Resin Component

Nylon 1: A blend of N11 (Rilsan BESN O TL) and N6/66 (Ube 5033B)

Nylon 2: N6/66 (CM6001FS)

Additive 1: Plasticizer: N-butylbenzenesulfonamide, Compatibilizer: AR-201

Additive 2: Stabilizer: Irganox 1098, Tinuvin 622LD, and CuI

2. Rubber Component

BIMS: Brominated copolymer of isobutylene and para-methylstyrene sold under the tradename EXXPRO 89-4 by ExxonMobil Chemical Company having a mooney viscosity of about 45, approximately 5 weight % para-methylstyrene and about 0.75 mol % bromine DM16D: Hexadecyl dimethyl amine (Akzo Nobel)

6PPD: N-(1,3-dimethylbutyl)-N'-phenyl-p-phenylenediamine

ZnO: Zinc oxide curative

St-acid: Stearic acid curative

ZnSt: Zinc sterate curative

MBTS: Benzyothiazyl disulfide

3. Anti-block Agent for Rubber Pelletization

Talc: hydrated magnesium silicate (Ciba)

ZnO: zinc oxide

Igafos: Igafos 168 antioxidant (Ciba)

The Test Methods Used for Evaluation of the Examples and Comparative Examples were as Follows A) Measuring Volume Average Equivalent Dispersion Diameter and Number Average Equivalent Dispersion Diameter Tapping phase AFM was applied to evaluate dispersion sizes and size distributions in these films. All film samples were cryo-faced at −150° C. using a Reichert cryogenic microtome with diamond knives. Faced samples were stored in a desiccator under flowing dry nitrogen to be warmed up to ambient temperatures without moisture. Samples were run within 24 hours after cryo-facing using an AFM (DI-3000, Digital Instrument) in tapping mode with a rectangular 225-μm silicon cantilever. All tapping phase AFM micrographs were converted to TIFF format and processed using PHOTOSHOP (Adobe Systems) for image enhancement. All image measurements were performed using a commercial image process tool kit (Reindeer Games) as an attachment to PHOTOSHOP. Results of image measurements were written into text files for subsequent data processing by EXCEL (Microsoft). The number average dispersion diameter Dn is calculated as:

$$Dn = \Sigma(n_1 D_1)/\Sigma(n_1)$$

$D_1$ is the equivalent diameter of individual dispersion and $n_1$ is the number of the dispersion with an equivalent diameter of $D_1$. The volume average dispersion diameter Dv is expressed as:

$$Dv = \Sigma(n_1 D_1^4)/\Sigma(n_1 D_1^3)$$

with, n1 is the number of dispersion with equivalent diameter of D1.

B) Tensile Fatigue Cycles

Film and a carcass compound were laminated together with an adhesive and cured at 190° C. for 10 min. A JIS No. 2 dumbbell shape was then punched out and used for durability test at −20° C. at 6.67 Hz and 40% strain.

C) Oxygen Permeability by Mocon

The oxygen permeation measurements were done using a Mocon OX-TRAN 2/61 permeability tester at 60° C.

D) Principal Refractive Indices by Metricon

Three principal refractive indices were measured using Metricon with an operating wavelength of 632.8 nm. Planar birefringence, PBR, and average refractive index, n, are calculated by $$PBR = (n1+n2)/2 - n3 \qquad (3)$$

$$n = (n1+n2+n3)/3 \qquad (4)$$

Here, n1, n2, and n3 are refractive indices along the machine direction, the transverse direction, and the film normal direction, respectively.

Examples 1-8

BIMS was pre-compounded with curatives in a Banbury internal mixer and pelletized with the anti-block agent prior to its mixing with Nylon. Mixing and dynamic vulcanization of Nylon and BIMS were done in a twin-screw extruder at about 230° C. These mixes were then cast or blown into films. 2" diameter disks were punched out from these films and conditioned in a vacuum oven at 60° C. overnight prior to the permeability measurements. Oxygen permeation values of these-films at 60° C. were measured using a Mocon OX-TRAN 2/61 permeability tester. Principal refractive indices along the three principal directions of these films were determined using a Metricon prism-coupling device. The operation wavelength was 632.8 nm generated by a low-power He—Ne laser. Using the three principal refractive indices, the average refractive index could be calculated as:

$$<n> = (n1+n2+n3)/3$$

wherein, <n> is the average refractive index. 1, 2, and 3 refer to machine, transverse, and normal (normal to the film plane) directions, respectively. The relative planar orientation could be expressed with the planar birefringence, or PBR, defined by (see U.S. Pat. No. 5,385,704)

$$PBR = (n1+n2)/2 - n3$$

In Examples 1-8, Nylon 1 matrix with the addition of plasticizer and compatibilzer was used as shown in Table 1. Nylon 1 matrix with plasticizer has its viscosity closely match with that of BIMS. MBTS is a cure retarder and DM16D is a viscosity enhancer. Both can react with benzylic bromine of BIMS and affect its reactive compatibilization with Nylon. Because of the this interfacial bonding modification between BIMS and Nylon with MBTS and DM16D, Nylon orientation during film casting or blowing could be affected. As shown in Table 1, reduction in cast film thickness through the increase in wind-up speed with the same cast die results in an increase in planar orientation and a corresponding reduction in permeability. Although the permeability of the blown films could not be measured due to film surface adhesive, a reduction in film thickness through the increase in windup speed without changes in die or in blowup ratio, again, leads to an increase in planar orientation. The addition of MBTS and DM16D leads to a reduction in orientation. Overall, there is a strong correlation between PBR and permeability. Since we are using the same Nylon matrix for all films listed in Table 1, the average refractive index, which represent the density or the crystallinity in Nylon, remains constant. The results are plotted in FIG. 1, wherein the PBR in Example Nos. 4, 7 and 8 (see the plot #4, #7 and #8) were not within the scope of the present invention.

TABLE 1

| | Example No. | | | | | | | |
|---|---|---|---|---|---|---|---|---|
| | 1 | 2 | 3 | 4*[3] | 5 | 6 | 7*[3] | 8*[3] |
| Formulation (parts by weight) | | | | | | | | |
| BIMS | 100 | 100 | 100 | 100 | 100 | 100 | 100 | 100 |
| DM16D | 0 | 0 | 0 | 0 | 0 | 0 | 0 | 0.5 |
| MBTS | 0 | 0 | 0 | 0 | 0 | 0 | 1 | 0 |
| ZnO | 0.15 | 0.15 | 0.15 | 0.15 | 0.15 | 0.15 | 0.15 | 0.15 |
| St-acid | 0.60 | 0.60 | 0.60 | 0.60 | 0.60 | 0.60 | 0.60 | 0.60 |
| ZnSt | 0.30 | 0.30 | 0.30 | 0.30 | 0.30 | 0.30 | 0.30 | 0.30 |
| Nylon 1 | 68 | 68 | 68 | 68 | 68 | 68 | 68 | 68 |
| Additive 1 | 21 | 21 | 21 | 21 | 21 | 21 | 21 | 21 |
| Additive 2 | 0.5 | 0.5 | 0.5 | 0.5 | 0.5 | 0.5 | 0.5 | 0.5 |
| Process | | | | | | | | |
| Cast | Cast | Cast | Cast | Cast | — | — | Cast | Cast |
| Blown | — | — | — | — | Blown | Blown | — | — |
| Properties | | | | | | | | |
| Thickness (μm) | 130 | 180 | 230 | 280 | 130 | 180 | 150 | 150 |
| <n> | 1.5170 | 1.5165 | 1.5165 | 1.5167 | 1.5175 | 1.5184 | 1.5175 | 1.516 |

TABLE 1-continued

| | Example No. | | | | | | | |
|---|---|---|---|---|---|---|---|---|
| | 1 | 2 | 3 | 4*[3] | 5 | 6 | 7*[3] | 8*[3] |
| PBR ($10^{-3}$) | 4.91 | 3.95 | 3.02 | 1.25 | 2.24 | 2.11 | 1.85 | 1.4 |
| Permeability*[1] | 10.8 | 11.8 | 12.7 | 12.8 | nm*[2] | nm*[2] | 13.5 | 14.6 |

*[1]in a unit of cc * mil/($m^2$-day-mmHg).
*[2]did not measure due to the surface adhesive layer.
*[3]Comparative Example

Examples 9-13

In Examples 9 to 13, Nylon 1 matrix was used but without the plasticizer and compatibilizer. 6PPD could be a curative at the mixing temperature of 230° C. by crosslinking BIMS through benzylic bromines and, hence, removing them from reactive compatibilization. DM16D is a viscosity enhancer for BIMS that also react with benzylic bromine of BIMS. This modification of the interfacial bonding with the usage of DM16D and 6PPD could significantly lower the planar orientation and raise the film permeability as shown in Table 2. The results are shown in FIG. 1. Regardless, a good correlation could be found between PBR and permeability. The higher refractive index value in comparison with that in Table 1 reflects the fact that the Nylon matrix has no plasticizer. Hence, higher density or higher refractive index is expected.

TABLE 2

| | Example No. | | | | |
|---|---|---|---|---|---|
| | 9 | 10 | 11*[1] | 12*[1] | 13*[1] |
| Formulation (parts by weight) | | | | | |
| BIMS | 100 | 100 | 100 | 100 | 100 |
| DM16D | 0 | 0 | 1.0 | 2.0 | 3.0 |
| 6PPD | 0 | 0.6 | 0 | 0 | 0 |
| ZnO | 0.15 | 0.15 | 0.15 | 0.15 | 0.15 |
| St-acid | 0.60 | 0.60 | 0.60 | 0.60 | 0.60 |
| ZnSt | 0.30 | 0.30 | 0.30 | 0.30 | 0.30 |
| Nylon 1 | 95 | 95 | 95 | 95 | 95 |
| Additive 1 | 0 | 0 | 0 | 0 | 0 |
| Additive 2 | 0.7 | 0.7 | 0.7 | 0.7 | 0.7 |

TABLE 2-continued

| | Example No. | | | | |
|---|---|---|---|---|---|
| | 9 | 10 | 11*[1] | 12*[1] | 13*[1] |
| Process | | | | | |
| Cast Properties | Yes | Yes | Yes | Yes | Yes |
| <n> | 1.5184 | 1.5174 | 1.5175 | 1.5170 | 1.5171 |
| PBR ($10^{-3}$) | 3.2 | 2.25 | 1.1 | 0.98 | 1.1 |
| Permeability | 5.31 | 6.43 | 7.05 | 7.69 | 7.47 |

*[1]Comparative Example

Example 14-19

In Examples 14-19, Nylon 2 matrix, without N11 and without plasticizer, was used. In blending with Nylon 2, viscosity modifier, such as DM16D and 6PPD, is required to provide good viscosity matching and fine BIMS rubber dispersions. The concentration used for the anti-blocking agents listed in Table 3 is 0.5 to 1 phr. As indicated in Table 3, using ZnO as the anti-blocking agent could significantly affect the orientation. This anti-blocking agent may act as curative and, hence, remove benzylic bromines from BIMS for its reactive compatibilization with Nylon. A large removal of benzylic bromines from BIMS could lower the interfacial bonding between the Nylon and BIMS dispersions and reduce the ability of the film manufacturing process to orient Nylon. However, overall correlation between PBR and permeability holds. The even higher refractive index value as compared with that in Table 2 is the result of the N6/66 matrix used. The results are also shown in FIG. 1.

TABLE 3

| | Example No. | | | | | |
|---|---|---|---|---|---|---|
| | 14 | 15 | 16*[1] | 17 | 18 | 19 |
| Formulation (parts by weight) | | | | | | |
| BIMS | 100 | 100 | 100 | 100 | 100 | 100 |
| DM16D | 0 | 0 | 0 | 1.0 | 1.0 | 0 |
| 6PPD | 0.5 | 0.5 | 0.5 | 0 | 0 | 0.5 |
| Pelletization | Talc | Irgafos | ZnO | Talc | Irgafos | Talc |
| ZnO | 0.15 | 0.15 | 0.15 | 0.15 | 0.15 | 0.15 |
| St-acid | 0.60 | 0.60 | 0.60 | 0.60 | 0.60 | 0.60 |
| ZnSt | 0.30 | 0.30 | 0.30 | 0.30 | 0.30 | 0.30 |
| Nylon 2 | 98 | 98 | 98 | 98 | 98 | 98 |
| Additive 1 | 0 | 0 | 0 | 0 | 0 | 0 |
| Additive 2 | 0.75 | 0.75 | 0.75 | 0.75 | 0.75 | 0.75 |

TABLE 3-continued

| | Example No. | | | | | |
|---|---|---|---|---|---|---|
| | 14 | 15 | 16*[1] | 17 | 18 | 19 |
| Process | | | | | | |
| Cast/blown | Cast | Cast | Cast | Cast | Cast | Blown |
| Properties | | | | | | |
| <n> | 1.5215 | 1.5216 | 1.5215 | 1.5222 | 1.5217 | 1.5219 |
| PBR ($10^{-3}$) | 6.1 | 5.15 | 1.4 | 4.55 | 3.25 | 5.4 |
| Permeability | 1.38 | 1.51 | 1.92 | 1.27 | 1.37 | 1.42 |

*[1]Comparative Example

What is claimed is:

1. A process for producing an oriented thermoplastic elastomer film having reduced oxygen permeability and improved fatigue resistance and a planar birefringence (PBR) value defined by: PBR=[(n1+n2/2)−n3 wherein n1, n2 and n3 are refractive indices along the machine direction, the transverse direction, and the film normal direction, respectively, of equal to or greater than 0.002, by means of dynamic vulcanization of a blend of (A) a halogenated isobutylene elastomer and (B) polyamide, comprising:
   i) pretreating the isobutylene elastomer with zinc oxide;
   ii) pelletizing the thus treated isobutylene elastomer;
   iii) subsequently mixing the pelletized isobutylene elastomer with the polyamide under dynamic vulcanization conditions to produce a polymer mixture; and
   iv) casting or extrusion blowing said polymer mixture under conditions of a shear rate to control the molecular arrangement of the polyamide in the film to obtain said film.

2. The process of claim 1, wherein the amount of the halogenated isobutylene elastomer is 95 to 25 parts by weight and the amount of the polyamide is 5 to 75 parts by weight, wherein the total amount of the halogenated isobutylene elastomer and the polyamide is 100 parts by weight.

3. The process of claim 1, wherein the halogenated isobutylene elastomer is brominated poly(isobutylene-co-p-methylstyrene).

4. The process of claim 1, wherein the polyamide is at least one member selected from the group consisting of Nylon 6, Nylon 66 Nylon 11, Nylon 69, Nylon 12, Nylon 610, Nylon 612, Nylon 46, Nylon MXD6, Nylon 6/66 and the copolymers thereof.

5. The process of claim 1, wherein the shear rate is regulated by increasing a windup speed during casting, by increasing a windup speed during blowing, or by increasing a blow-up ratio during film blowing.

6. The process of claim 1, wherein the polymer blend is comprised of a plasticized polyamide and is absent of additional viscosity enhancer compounds.

* * * * *

UNITED STATES PATENT AND TRADEMARK OFFICE
CERTIFICATE OF CORRECTION

PATENT NO.        : 7,879,272 B2
APPLICATION NO.   : 12/648057
DATED             : February 1, 2011
INVENTOR(S)       : Soeda et al.

It is certified that error appears in the above-identified patent and that said Letters Patent is hereby corrected as shown below:

On the Title page at Item (75) Inventors: "Foshee Joyce Caraway" should read
--Joyce Foshee Caraway--

Signed and Sealed this
Seventh Day of June, 2011

David J. Kappos
*Director of the United States Patent and Trademark Office*